(12) United States Patent
Dapp

(10) Patent No.: US 7,225,467 B2
(45) Date of Patent: May 29, 2007

(54) ACTIVE INTRUSION RESISTANT ENVIRONMENT OF LAYERED OBJECT AND COMPARTMENT KEYS (AIRELOCK)

(75) Inventor: Michael C. Dapp, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 900 days.

(21) Appl. No.: 09/973,769

(22) Filed: Oct. 11, 2001

(65) Prior Publication Data
US 2002/0066035 A1     May 30, 2002

Related U.S. Application Data

(60) Provisional application No. 60/248,906, filed on Nov. 15, 2000.

(51) Int. Cl.
　　*G08B 23/00*　　(2006.01)
　　*G06F 11/20*　　(2006.01)
　　*G06B 15/173*　　(2006.01)
　　*H04L 9/00*　　(2006.01)

(52) U.S. Cl. .................. 726/23; 709/225; 709/239; 713/153

(58) Field of Classification Search ........ 709/220–226, 709/229, 238–244; 713/153, 154, 200, 201; 726/22–24
See application file for complete search history.

(56) References Cited

U.S. PATENT DOCUMENTS 4,279,034 A　　7/1981　Baxter ........................ 714/4

(Continued)

FOREIGN PATENT DOCUMENTS

CA　　2307529　　9/2001

(Continued)

OTHER PUBLICATIONS

Kent, RFC 2401, "Security Architecture for the Internet Protocol," 1998.*

(Continued)

*Primary Examiner*—Gilberto Barron
*Assistant Examiner*—Matthew Heneghan
(74) *Attorney, Agent, or Firm*—Miles & Stockbridge PC; James T. Carmichael

(57) ABSTRACT

A high level of security and fault tolerance is provided in a digital network by use of highly secure infrastructure of user transparent signalling for communicating detection of signals at a network node having characteristics of a potential attack to another node and controlling communications at routers at the node from another node in response to the user transparent signals. A processor is connected to the routers and the network through an encryption engine and includes a manager object to issue control commands to nodes of a locally lower hierarchy tier and managed objects to detect potential attacks and exercise control over the routers responsive to signals from a node of a locally higher hierarchy tier. Identifications are provided for communications between nodes regardless of whether or not a corresponding user is identified and communications are logged. Thus any network session comprises one or more secure sessions in a plurality of security domains and any fault or potential attack can be compartmentalized to a node or sector of the network and isolated while normal communications are continued over redundant network links.

15 Claims, 8 Drawing Sheets

U.S. PATENT DOCUMENTS

| | | | |
|---|---|---|---|
| 4,527,270 A | 7/1985 | Sweeton | 714/47 |
| 4,556,972 A | 12/1985 | Chan et al. | 370/354 |
| 4,622,546 A | 11/1986 | Sfarti et al. | 345/551 |
| 4,879,716 A | 11/1989 | McNally et al. | 710/316 |
| 5,003,531 A | 3/1991 | Farinholt et al. | 370/223 |
| 5,027,342 A | 6/1991 | Boulton et al. | 370/225 |
| 5,193,192 A | 3/1993 | Seberger | |
| 5,214,778 A | 5/1993 | Glider et al. | 714/2 |
| 5,247,664 A | 9/1993 | Thompson et al. | 707/10 |
| 5,280,577 A | 1/1994 | Trevett et al. | 345/469 |
| 5,319,776 A | 6/1994 | Hile et al. | |
| 5,379,289 A | 1/1995 | DeSouza et al. | 370/230 |
| 5,414,833 A | 5/1995 | Hershey et al. | 713/201 |
| 5,511,213 A | 4/1996 | Correa | |
| 5,513,345 A | 4/1996 | Sato et al. | 714/4 |
| 5,600,784 A | 2/1997 | Bissett et al. | 714/12 |
| 5,606,668 A * | 2/1997 | Shwed | 713/201 |
| 5,621,889 A | 4/1997 | Lermuzeaux et al. | 713/200 |
| 5,649,215 A | 7/1997 | Itoh | 704/9 |
| 5,655,068 A | 8/1997 | Opoczynski | 714/4 |
| 5,666,479 A | 9/1997 | Kashimoto et al. | 714/1 |
| 5,684,957 A | 11/1997 | Kondo et al. | 713/201 |
| 5,696,486 A | 12/1997 | Poliquin et al. | 340/506 |
| 5,737,526 A * | 4/1998 | Periasamy et al. | 709/241 |
| 5,742,771 A | 4/1998 | Fontaine | 709/225 |
| 5,798,706 A | 8/1998 | Kraemer et al. | 713/201 |
| 5,805,801 A | 9/1998 | Holloway et al. | 713/201 |
| 5,815,647 A | 9/1998 | Buckland et al. | 714/3 |
| 5,832,227 A | 11/1998 | Anderson et al. | 709/224 |
| 5,848,410 A | 12/1998 | Walls et al. | |
| 5,850,515 A | 12/1998 | Lo et al. | |
| 5,905,859 A | 5/1999 | Holloway et al. | 726/22 |
| 5,919,257 A | 7/1999 | Trostle | 713/200 |
| 5,919,258 A | 7/1999 | Kayashima et al. | 713/201 |
| 5,920,698 A | 7/1999 | Ben-Michael et al. | 709/224 |
| 5,922,049 A * | 7/1999 | Radia et al. | 709/220 |
| 5,958,015 A | 9/1999 | Dascalu | 709/229 |
| 5,969,632 A | 10/1999 | Diamant et al. | 340/5.3 |
| 5,982,890 A | 11/1999 | Akatsu | 707/200 |
| 5,991,881 A | 11/1999 | Conklin et al. | 713/201 |
| 5,995,963 A | 11/1999 | Nanba et al. | |
| 6,000,045 A | 12/1999 | Lewis | 714/47 |
| 6,006,019 A | 12/1999 | Takei | 709/224 |
| 6,021,510 A | 2/2000 | Nachenberg | |
| 6,083,276 A | 7/2000 | Davidson et al. | |
| 6,094,731 A | 7/2000 | Waldin et al. | |
| 6,119,236 A * | 9/2000 | Shipley | 71/201 |
| 6,151,624 A | 11/2000 | Teare et al. | |
| 6,167,448 A | 12/2000 | Hemphill et al. | |
| 6,173,333 B1 | 1/2001 | Jolitz et al. | |
| 6,182,029 B1 | 1/2001 | Friedman | 704/9 |
| 6,233,704 B1 * | 5/2001 | Scott et al. | 714/717 |
| 6,279,113 B1 | 8/2001 | Vaidya | |
| 6,282,546 B1 | 8/2001 | Gleichauf et al. | |
| 6,295,276 B1 * | 9/2001 | Datta et al. | 370/218 |
| 6,301,668 B1 * | 10/2001 | Gleichauf et al. | 713/201 |
| 6,304,973 B1 | 10/2001 | Williams | |
| 6,321,338 B1 | 11/2001 | Porras et al. | 726/25 |
| 6,363,489 B1 | 3/2002 | Comay et al. | |
| 6,366,934 B1 | 4/2002 | Cheng et al. | |
| 6,370,648 B1 | 4/2002 | Diep | |
| 6,374,207 B1 | 4/2002 | Li et al. | |
| 6,393,386 B1 * | 5/2002 | Zager et al. | 703/25 |
| 6,405,318 B1 | 6/2002 | Rowland | |
| 6,408,311 B1 | 6/2002 | Baisley et al. | |
| 6,418,446 B1 | 7/2002 | Lection et al. | |
| 6,421,656 B1 | 7/2002 | Cheng et al. | |
| 6,446,110 B1 | 9/2002 | Lection et al. | |
| 6,684,335 B1 | 1/2004 | Epstein et al. | 726/23 |
| 6,697,950 B1 | 2/2004 | Ko | |
| 6,792,546 B1 | 9/2004 | Shanklin et al. | |
| 6,862,588 B2 | 3/2005 | Beged-Dov et al. | |
| 2001/0056504 A1 | 12/2001 | Kuznetsov | |
| 2002/0010715 A1 | 1/2002 | Chinn et al. | |
| 2002/0013710 A1 | 1/2002 | Shimakawa | |
| 2002/0035619 A1 | 3/2002 | Dougherty et al. | |
| 2002/0038320 A1 | 3/2002 | Brook | |
| 2002/0059528 A1 | 5/2002 | Dapp | 726/23 |
| 2002/0066035 A1 | 5/2002 | Dapp | |
| 2002/0069318 A1 | 6/2002 | Chow et al. | |
| 2002/0073091 A1 | 6/2002 | Jain et al. | 707/100 |
| 2002/0073119 A1 | 6/2002 | Richard | |
| 2002/0082886 A1 | 6/2002 | Manganaris et al. | |
| 2002/0083343 A1 | 6/2002 | Crosbie et al. | |
| 2002/0087882 A1 | 7/2002 | Schneier | |
| 2002/0091999 A1 | 7/2002 | Guinart | |
| 2002/0099710 A1 | 7/2002 | Papiemiak | |
| 2002/0099715 A1 | 7/2002 | Jahnke et al. | |
| 2002/0099734 A1 | 7/2002 | Yassin et al. | |
| 2002/0103829 A1 | 8/2002 | Manning et al. | |
| 2002/0108059 A1 | 8/2002 | Canion et al. | |
| 2002/0111963 A1 | 8/2002 | Gebert et al. | |
| 2002/0111965 A1 | 8/2002 | Kutter | |
| 2002/0112224 A1 | 8/2002 | Cox | |
| 2002/0116550 A1 | 8/2002 | Hansen | |
| 2002/0116585 A1 | 8/2002 | Scherr | |
| 2002/0116644 A1 | 8/2002 | Richard | |
| 2002/0120697 A1 | 8/2002 | Generous et al. | |
| 2002/0122054 A1 | 9/2002 | Hind et al. | 715/731 |
| 2002/0133484 A1 | 9/2002 | Chau et al. | |
| 2002/0143819 A1 | 10/2002 | Han et al. | |
| 2002/0152244 A1 | 10/2002 | Dean et al. | |
| 2002/0156772 A1 | 10/2002 | Chau et al. | |
| 2002/0165872 A1 | 11/2002 | Meltzer et al. | |
| 2003/0041302 A1 | 2/2003 | McDonald | |
| 2003/0229846 A1 | 12/2003 | Sethi et al. | |
| 2004/0025118 A1 | 2/2004 | Renner | 715/542 |
| 2004/0073870 A1 | 4/2004 | Fuh et al. | |
| 2004/0083221 A1 | 4/2004 | Dapp et al. | 707/100 |
| 2004/0083387 A1 | 4/2004 | Dapp et al. | 726/23 |
| 2004/0083466 A1 | 4/2004 | Dapp et al. | 717/143 |
| 2004/0172234 A1 | 9/2004 | Dapp et al. | 704/1 |
| 2004/0194016 A1 | 9/2004 | Liggitt | |
| 2005/0039124 A1 | 2/2005 | Chu et al. | |
| 2005/0177543 A1 | 8/2005 | Chen et al. | |

FOREIGN PATENT DOCUMENTS

| | | |
|---|---|---|
| JP | 2000-112860 | 4/2000 |
| JP | 2000-314324 A | 12/2000 |
| JP | 2002-526830 | 8/2002 |
| JP | 2003-521779 | 7/2003 |
| WO | WO 02/11399 | 2/2002 |
| WO | WO 02/095543 A2 | 11/2002 |

OTHER PUBLICATIONS

M. Neumann; "Encryption Black Box (SiNic)"; ESNET Steering Committee Meeting, Sep. 11-13, 2001.

E. Zadok; "Stackable File Systems as a Security Tool"; Technical Report CUCS-036-99 Columbia University Computer Science Deapartment; Dec. 1999; pp. 1-19.

Fraser et al; "Hardening COTS Software with Generic Software Wrappers"; DARPA Information Survivability Conference and Exposition; 2000; pp. 323-337.

Pal et al; "Open Implementation Toolkit for Building Survivable Applications"; DARPA Information Survivability Conference and Exposition; 2000; pp. 197-210.

A.B. Kulkarni, S.F. Bush and S.C. Evans "Detecting Distributed Denial-of- Service Attacks Using Kolmogorv Complexes Metrics" dated Dec. 2001.

S.C. Evans and S.F. Bush "Symbol Compression Ratio for String Compression and Estimation and Kolmogorov Complexity" dated Nov. 2001.

Lunteren et al. "XML Accelerator Engine", 2004.

Sakharov, "Finite State Machine Specification and Generation in Java", 2000, http://sakharov.net/fsm.html.

Andrivet et al., "A Simple XML Parser", Jul. 1999, C/C++Users Journal, R&D Publications, Lawrence, KS, US, pp. 22,24,26-28,30,32, XP008015172, ISSN: 1075-2838.

Cooper, C., "Using Expat", Sep. 1, 1999, XP002177815.

A.B. Kulkarni; S.F. Bush and S.C. Evans "Detecting Distributed Denial-of-Service Attacks Using Kolmogorov Complexity Metrics" dated Dec. 2001.

S.C. Evans and S.F. Bush "Symbol Compression Ratio for String Compression and Estimation of Kolmogorov Complexity" dated Nov. 2001.

B. Trippe; "XML Hits the Big Time: Major Database Players get into XML"; Find articles.com; Sep. 2002; pp. 1-9.

Business Wire, Bellevue, Wash; "DataChannel Releases the Most Advanced XML Parser—XJParser—and Introduces xDev its XML Developers Program"; Find articles.com; Apr. 16, 1999, pp. 1-9.

InfoWorld: "Extensible Markup Language (XM). (Technology Information)"; Find articles.com; Jun. 1998; pp. 1-6.

T. Yager; "New Standards Orbit (XML) (Technology Information)"; Find articles.com; Jun. 2000; pp. 1-9.

Microsoft Corp., "XML: Enabling Next-Generation Web Applications"; Dytech Solutions; Apr. 1998; pp. 1-15.

Aho, A.V. et al., "Principles of Compiler Design", Principles of Compiler Design, Reading, Addison-Wesley Publishing Co., US., 1979, pp. 73-125, XP002140006, pp. 88, line 4—p. 115, line 7; figures 3.5-3.22.

Bauer, F.L., "Compiler Construction—An Advanced Course", 1976, Springer-Verlag, Germany, XP002312623, pp. 42-55; pp. 85-108.

* cited by examiner

ACTIVE INTRUSION RESISTANT ENVIRONMENT OF LAYERED OBJECT AND COMPARTMENT KEYS (AIRELOCK)

CROSS-REFERENCE TO RELATED APPLICATIONS

This application claims priority of U.S. provisional Application Ser. No. 60/248,906, filed Nov. 15, 2000, and assigned to the assignee of the present application, as does concurrently filed related application Ser. No. 09/973,776 both of which are hereby fully incorporated by reference.

BACKGROUND OF THE INVENTION

1. Field of the Invention

The present invention generally relates to digital communications networks and, more particularly, to the development of the properties of high levels of security and fault tolerance to permit network functionality in the presence of denial of service and other attacks.

2. Description of the Prior Art

Numerous technical developments and economic forces have led to the widespread use of distributed data processing systems in which numerous data processors, each of which may be capable of functioning independently, are connected by a network in order to share both data and hardware and software resources. The connectivity of the system may be hard wired over a local or wide area network or may use links which are more or less accessible to the public, such as the Internet which utilizes many common carrier communication links which may be made available to a given processor through various hardware interfaces. When such technical capabilities such as the development of the TCP/IP protocol were being initially developed, however, flexibility of interconnectivity, scalability and ease and reliability of data exchange were of paramount importance and the importance of security measures was not fully appreciated and left to be implemented at individual processors or individual resources to prevent access from other connected processors.

Of course, a given processor may be effectively connected to more than one network at a time and thus a publicly accessible network can be used to access another network, potentially through a sequence of processors. On the other hand, limiting access of processors to only secure or unsecure networks reduces functionality of the processor to levels which may be unacceptable due to the reduction of accessible resources. It is also in the versatile nature of data processors that any security feature that may be devised may also be defeated and protection of sensitive resources is entirely grounded in the difficulty of defeating the security measures utilized. Further, as alluded to above, restriction of access is usually provided only at individual processors or resources (e.g. applications) and not within the network, itself.

As the use of TCP/IP networking has grown, techniques for exploiting a lack of security have been discovered, developed, implemented and widely shared in the hacker community worldwide. This circumstance presents a fundamental threat to the global network infrastructure that must be ameliorated if security of any network or connected resource is to be achieved.

Accordingly, there are numerous reports of increasingly sophisticated intruder attacks on both military and commercial computer systems. Computer attacks may take the form of gaining access to sensitive data (to either learn its contents or to corrupt it) resident on individual systems or in the form of a so-called virus or worm to damage or destroy processors or resources in a largely indiscriminate manner.

Yet another form of attack which is of increasing concern is the "denial of service" (DOS) attack in which normal network functions are demanded at rates approaching or exceeding system capacity to respond, thereby denying service to other requestors or otherwise disrupting other communications or services such as overloading telephone or power distribution networks. It has also been reported by numerous studies that many such attacks, regardless of form, are initiated by persons having some level of legitimate authorized access to the system attacked or at least a connected system.

Networks are inherently susceptible to attack by exploitation of security weaknesses in network protocols and infrastructure components. In addition to unauthorized viewing and modification of data, alluded to above, security controls of the operating systems and applications installed on the network may be circumvented, network firewalls (used extensively at network boundaries) may be penetrated, network functions may be disrupted, sessions of authorized users (after they have been authenticated) can be stolen and routing functions of the network can be disrupted to misdirect network data. A concerted attack on military network infrastructure can compromise military operations or force network shutdown. Identification and authentication (I&A) capabilities provided by recently developed forms of identification certificates does not provide technical mechanisms to respond to attacks against network protocols.

Traditionally, a three layered approach has been taken in an attempt to provide protection of networks. The first layer is the extensive use of firewalls to control access to the network from outside the network. However, firewalls become geometrically more difficult to manage as the number and variety of authorized accesses increases. This difficulty is particularly evident in military networks which become particularly susceptible to penetration through exploitation of errors in configuration of their access control rule set.

However, firewalls are not fully effective since the manner in which TCP/IP manages packet fragmentation can be exploited for "punching through" the packet filtering system of firewalls. "Session Hijacking", although complex, can be automated to negate effective use of strong user authentication. Further, it is difficult to force all network access to be made only through the firewall. The availability of commercial modems that interface to digital PBX systems and the Remote Access Server included in Microsoft Windows™ software makes control of the use of dial-up connections to the network through firewalls impractical.

The second layer of protection is strong user authentication such as biometric systems and digital certificates. However, such systems are costly and generally implemented on only the most sensitive systems and can, nevertheless, be rendered ineffective by session hijacking attacks, alluded to above, because of the inability of TCP/IP to authenticate the source address packets, to close out "half-open" connections and to protect the session sequence numbers contained in the TCP header.

The third layer of protection is to maintain separate networks for each level of security classification or class of access authorization and to depend on personnel clearances. This approach is extremely costly, limits the functionality of each separate system, presents problems of maintaining data integrity and provides no protection from misuse or damage by persons having access to any given system. Further, it is generally desirable to be able to accommodate both mandatory access control (MAC) in which access is controlled based on classification of the information or resource and discretionary access control (DAC) which is based on a correlation of anticipated user function and the nature of data that may be needed to perform that function. It can be readily appreciated that MAC and DAC may each be complex and overlap with much increased complexity, greatly multiplying the number of separate systems which may be required among which data integrity must be maintained.

Detection of an attack before substantial damage is done is often difficult, particularly when the attack is of the denial of service type. Viruses, for example, cannot be detected before at least some of their basic characteristics (e.g. a filename by which they are executed) is known; by which time the virus may have been widely proliferated, causing some degree of damage to each computer it has reached. A denial of service attack is, by its nature, indistinguishable from other intended functions of the system except for the volume of transactions it presents and possible similarities of requested services necessitated by the volume of requests required for a successful attack.

In general, when an attack is detected, at least a major portion of network services must be disrupted in order to respond to the attack. Therefore, achieving a degree of certainty that an attack is in progress commensurate with the magnitude of necessary system disruption often unacceptably delays action and thus does not acceptably limit damage or prevent access to critical data or resources.

In summary, enhancement of security in digital networks is extremely challenging in view of the weaknesses in protocols which cannot readily be changed. Most approaches proposed to date are extremely costly and compromise system functionality and utility while being difficult to implement in complex environments that cannot readily be modified. Proposals for security enhancements to date have also not been easily scalable, potentially functional across multiple networks or globally, adequately sensitive to potential attacks, capable of accurately and quickly isolating a fault or an attack and allowing error recovery or able to actively protect against attacks by authorized users, the currently most frequent source of system attacks.

SUMMARY OF THE INVENTION

It is therefore an object of the present invention to provide a network security system and management method capable of maintaining network functions during attacks of arbitrary nature and frequency.

It is another object of the invention to provide a network infrastructure supporting current protocols and technology which is, itself, extremely secure while enhancing network security and providing accurate and rapid fault or attack isolation and rapid and convenient error recovery.

It is a further object of the invention to provide for minimization of network disruption when a potential attack is detected so that increased sensitivity to potential attacks may be employed consistent with maintaining network function substantially unaffected.

It is yet another object of the invention to provide fine-grained and layered security domains in a digital communications or data processing network to support selective compartmentalization of any fault or potential attack.

It is another object of the invention to assign encrypted identifications to otherwise unidentified users to provide uniform handling of all users and for tracking attacks and facilitating error recovery.

In order to accomplish these and other objects of the invention, a security device for respective network nodes and a network secured thereby are provided including at least two locking devices at each of a plurality of nodes of the digital network, a security policy manager device for detecting network communications or activity having some characteristics different from characteristics of normal usage and providing a signal to another network node, and a routing arrangement responsive to a user transparent signal from another node for controlling the locking devices to isolate a node selecting redundant communication paths in the digital network to maintain network communications between other network nodes.

In accordance with another aspect of the invention, a method of operating a digital network is provided including steps of detecting communications having characteristics differing from characteristics of normal usage, communicating a user transparent signal to another node responsive to the detection, and controlling communications at the node from another node with a user transparent signal.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
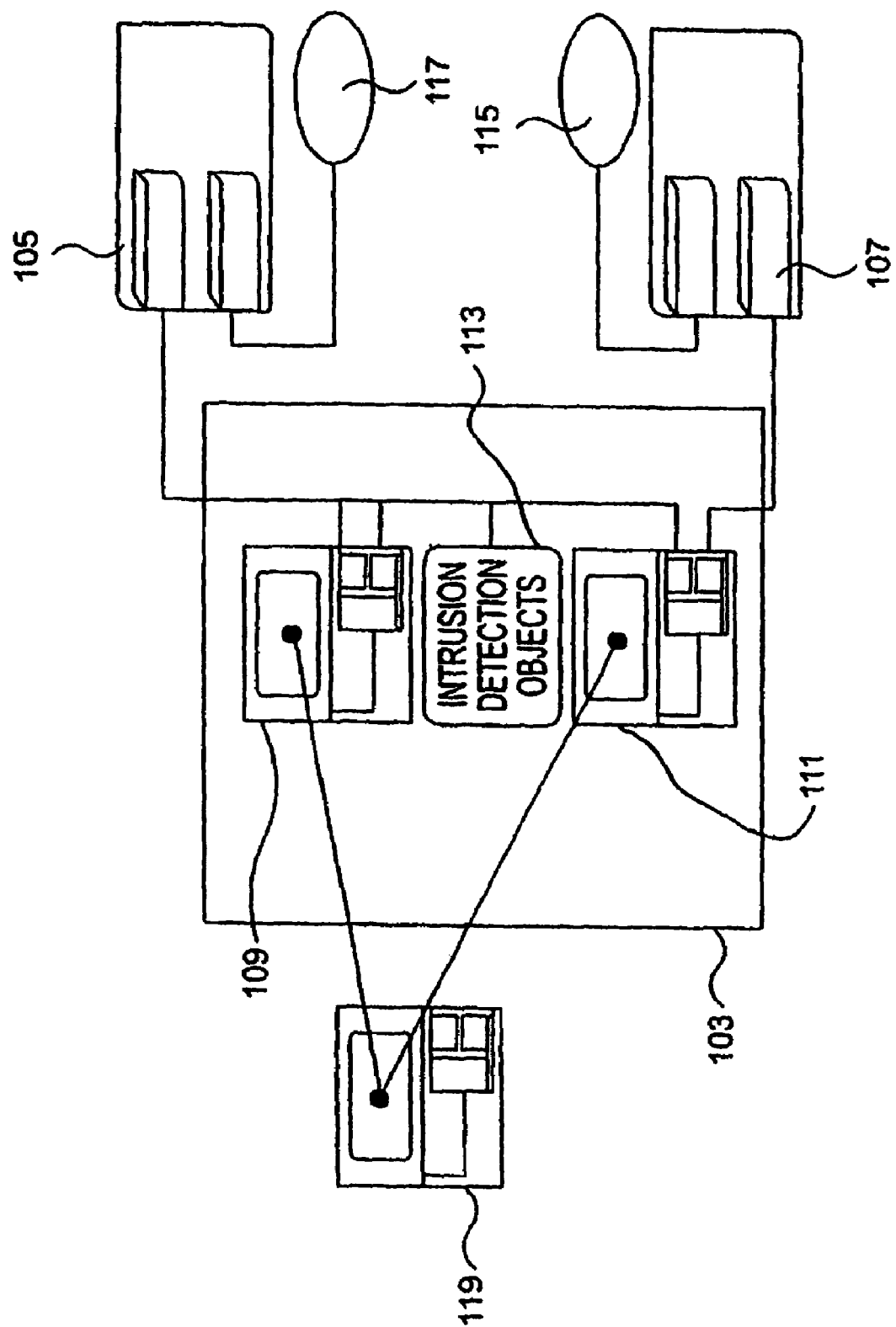
FIG. 1 is a schematic diagram of a basic element of the network in accordance with the invention and including a lock circuit including two routers providing communications from different networks.

Referring now to the drawings, and more particularly to FIG. 1, there is shown a basic network element 103 and associated network nodes in accordance with the invention. It should be understood that routers are well-understood network elements for controlling communications between nodes of a network although only a single router (but which may have an arbitrary number of ports) would normally be associated with a given node of the network. Use of a lock in combination with routers is also well-understood in the art. However, it should be understood that no portion of any Figure is admitted to be prior art in regard to the present invention.

As will become clear from the following discussion, the present invention provides a secure, fault-tolerant network than can implement an arbitrary security policy with arbitrarily fine granularity and continue to provide service in the presence of a variety of hardware failures and security penetration attacks. This is accomplished by developing a networking subsystem by inclusion of enhancements which accommodate existing elements of network architecture and software and integrate fault tolerant extensions of object oriented programming architecture, strong encryption strong authentication at the node and data packet level and real-time active responses to detection of faults and attacks with enhanced sensitivity.

It should also be appreciated that while the preferred form of the invention will be discussed the context of well-known standard protocols and a preferred common object request broker architecture (CORBA, an architecture that, including extensions such have been made commercially available by the assignee of the present invention under the name "Hardpack" for developing a high degree of fault tolerance, such as repairing or replacing software objects from other nodes when needed, as is summarized in the above-incorporated U.S. provisional patent application, enables modules of software, known as "objects" to communicate with one another) and common management information protocol (CMIP, an open system interconnection (OSI) standard protocol used with common management information services (CMIS) standard protocol) other architectures and protocols may be used to embody the invention.

As will be discussed below, the basic principle of the invention is the use of a highly secure user transparent subsystem infrastructure which can detect failures and questionable activity and communicate, in a secure and encrypted form, the potential condition of a network node to adjacent nodes which can then isolate or encapsulate a potentially compromised node while rerouting normal network traffic to integrate the extended and fault tolerant CORBA architecture with strong encryption, enhanced intrusion detection and an effective security policy to support effective active responses to faults and potential attacks. This reporting supports fine-grained control of network access as well as logging of information concerning network activity and node status to limit damage, improve detection and facilitate recovery from a wide variety of failures and attacks.

As shown in FIG. 1, the overall function of the interface element 103 including two locking devices 109, 111 and two routers 105, 107 is to support communications with and between networks 115, 117 through routers 105, 107 and with network node 119 which may or may not also include a similar interface element. Thus, it can be appreciated that interface element 103 can control the connectivity of three network nodes. Further, it can be appreciated that locking devices 109, 111 communicate with each other to provide connectivity between networks 115, 117 as well as with processor 119. Thus, the interface element 103 can function as a lock to interrupt communications between networks, nodes or terminals at a particular network node.

Locking devices are generally implemented on separate cards (a preferred form of which is known as a VME card) which are connectable to other circuits through a rack or "motherboard" arrangement or the like. Therefore, it is convenient to provide additional security structure at a location electrically between the two locking devices (e.g. connected to a common bus). In accordance with the invention, this is preferably accomplished with a processor on a separate card (represented by 113 of FIG. 1) processing fault and intrusion detection objects as well as encryption and decryption algorithms for communication of data regarding potential faults and attacks to similar cards at other network nodes. Thus it is seen that the basic element of the invention can be mechanically assembled and integrated into a system in a simple and convenient manner while not affecting other parts of the network or normal functions thereof. Accordingly, implementation of the invention can be performed incrementally and scalably to any desired degree including global implementation.

Functionally, it should be appreciated that the processor arrangement 113 can implement any number of objects for fault or intrusion detection and which may be of any arbitrary design, including a number of algorithms which are commercially available for the purpose. Results of the execution of these objects can be communicated over normal network links to other nodes and used to exercise any desired control over the locking devices and/or to log any desired information concerning the status or operations of any node.

All of these communications are preferably encrypted in accordance with any desired encryption algorithm (DES, DES-3 or Type 1 algorithms implemented in hardware for highest speed being preferred) which may also be altered and keys arbitrarily exchanged and altered by the same type of communications which are entirely transparent to all users and may be made arbitrarily difficult to intercept by any of a number of known techniques which will be evident to those skilled in the art. Further, each transmission or group of transmissions for a given user) may be supplied with identification information (e.g. in the form of a stamp or the like) by processor 113, even if the user is not identified and any desired tracking or logging information may be transmitted to other nodes for error recovery and determination of the source of any detected potential attack as well as continuous monitoring and authentication of the source node for all communications, potentially to the data packet level.

These detection operations and communications may be conducted in real time (often referred to as log time since the actual time required is a fixed multiple of the logarithm of the number of the nodes secured and thus increases slowly as the number of nodes increases and the granularity of protection is made finer) and communications performed at extremely high data rates potentially as great as or exceeding 10 Gbps since it is essentially only necessary for boards 113 at different network nodes to be compatible and communicate with each other and with complete independence from other processors connected to the network. Accordingly, the processor card 113 is referred to as a security policy manager card. It should be appreciated that implementation of such capabilities in combination with routers which also support a high level of security (e.g. cards supporting audit, MAC, DAC, user identification and authentication security functions) enables active network response to security alerts and isolation of compromised nodes from uncompromised nodes in substantially real time as will be discussed in more detail below.

Figure 2:
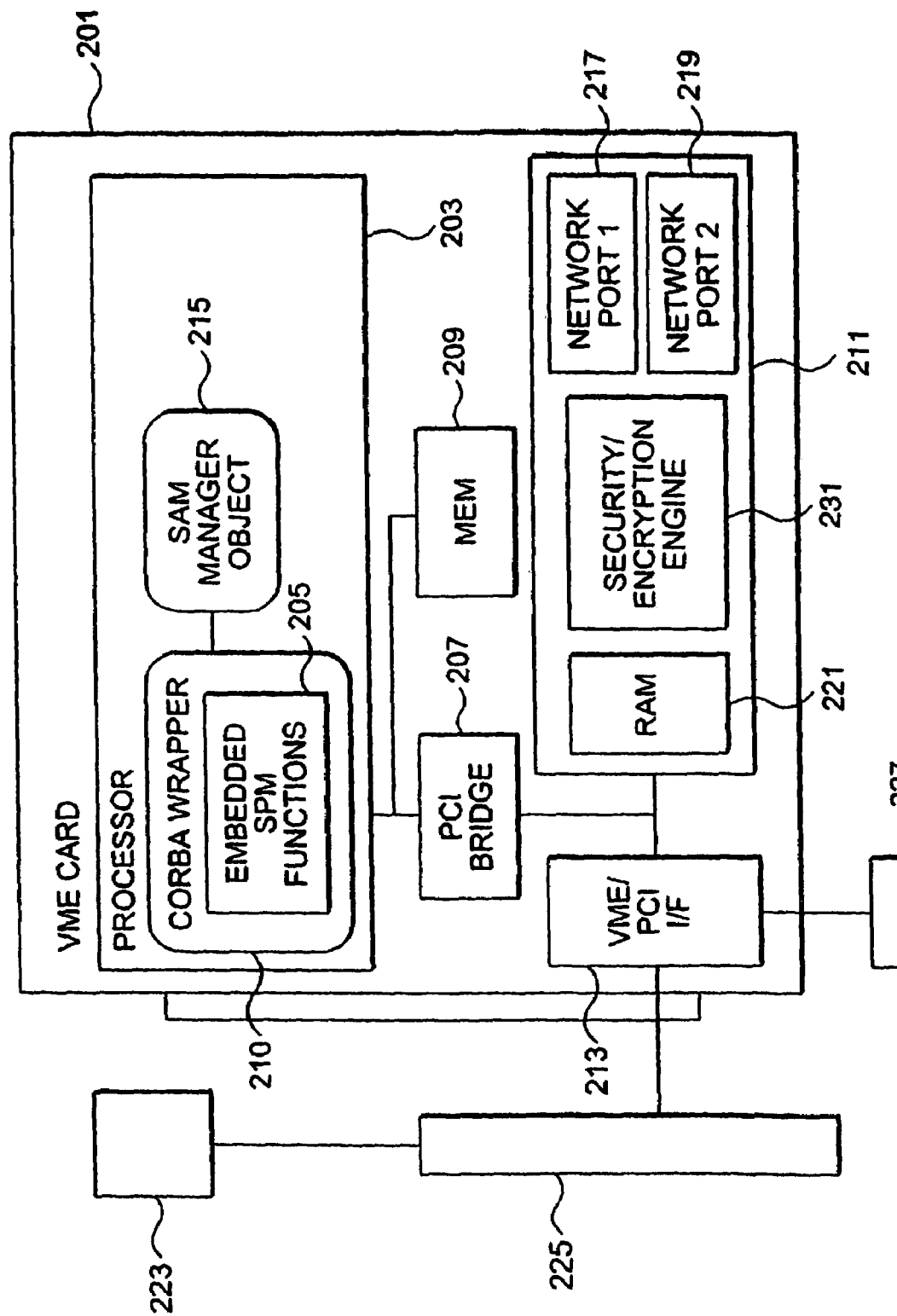
FIG. 2 is a schematic diagram of the lock circuit of FIG. 1 as embodied on a VME circuit cards, as is preferred.

A preferred form 201 of the security policy manager card 113 is schematically illustrated in FIG. 2. Processor 203 may be any of several commercially available types but processors having clock speeds of 300 MHz or higher are preferred to support high speed communications and rapid response of attack detection and fault reporting software which preferably are configured as objects that communicate with each other in accordance with CORBA architecture 210 alluded to above.

It should be appreciated that communications bit rates can be much higher than processor clock rates since messages may be assembled at any clock rate and transmitted as a burst at arbitrarily high bit rates. The specifics of fault and attack detection objects are not important to the practice of the invention and many commercially available applications may be used to practice the invention. Since these objects are essentially software modules that communicate with each other but may or may not be run in a particular sequence, a high clock rate is desirable to enhance response time and achieve effective concurrency of execution of these objects.

It is considered desirable, however, that attack detection objects be provided which will detect activity which may have a relatively low or moderate likelihood of representing an actual attack since the architecture of FIG. 1 allows very fine-grained isolation of nodes which may potentially be compromised and thus minimizes system disruption, possibly for only a very short and possibly even unnoticeable period. That is, since the scope and duration of system disruption in response to a real or potential attack can be held to a minimum, the level of certainty of an attack that may be represented in network activity detected by an object can also be correspondingly low; yielding a much enhanced level of security and damage avoidance and an arbitrarily high degree of sensitivity to questionable characteristics of communication which may differ from characteristics of normal usage by an arbitrarily small degree.

These objects are collectively depicted as embedded security policy manager (SPM) functions 205, some of which are fault reporting and attack detection objects while others will be referred to hereinafter as managed objects. More generally, managed objects include network interface managed objects, intrusion detection managed objects and network service managed objects. In accordance with the invention, a manager object 215 or a plurality thereof is also provided. The articulation of the objects in software is not particularly important to the practice of the invention but the concept of manager and managed objects will be helpful in understanding the principles of the invention.

The security policy manager (SPM) card also preferably includes a memory 209 associated with the processor particularly for storing processor programs, logging processor activity and loading the CORBA wrapper and embedded objects, including manager objects upon processor initialization or on an "as needed" basis when an object is missing or damaged by replication from another node, as alluded to above. A peripheral component interconnect (PCI) bridge 207 is also provided to interface processor 203 to the network communication interface 211 and a VME/PCI (peripheral component interconnect) interface 213 which, in turn, provides connectivity to local peripherals 223, 225 and 227 of any desired type or nature.

The network communication interface preferably includes a random access memory (RAM) 221 serving as a buffer between the processor 203 and the remainder of the network interface. Two or more communications ports 217, 219 are provided as discussed above in connection with FIG. 1. A security/encryption engine 231 is provided to connect the network ports 217, 219 to the buffer RAM 221. This element is referred to as a security/encryption engine since it is preferred that its function be embodied in hardware in order to achieve the desired extremely high bit rate for the communications between security controller cards at different network nodes. Such high bit rates are particularly desirable since they substantially contribute to the security of the system in accordance with the invention by allowing the overall message to be sent with an extremely short duty cycle; increasing difficulty of interception, as well as being beyond the capacity of software-based processors to receive, process or simulate. However, such high bit rates are not critical to the successful practice of the invention in accordance with its basic principles.

Additionally, it should be recognized that while encryption is desirable in implementations of the invention where communications are conducted between SPM cards with signals which may be known, these communications are entirely transparent to the user and it is only necessary for the SPM cards to use compatible signals in order to communicate and for the signals to be relatively insusceptible to decoding or simulation. Therefore, as long as the coded signals used in these user transparent communications (which could be changed at will or as necessary without hardware changes through use of an EEPROM or the like) are relatively secure, an additional encryption/decryption process is not necessary to the practice of the invention.

Figure 3:
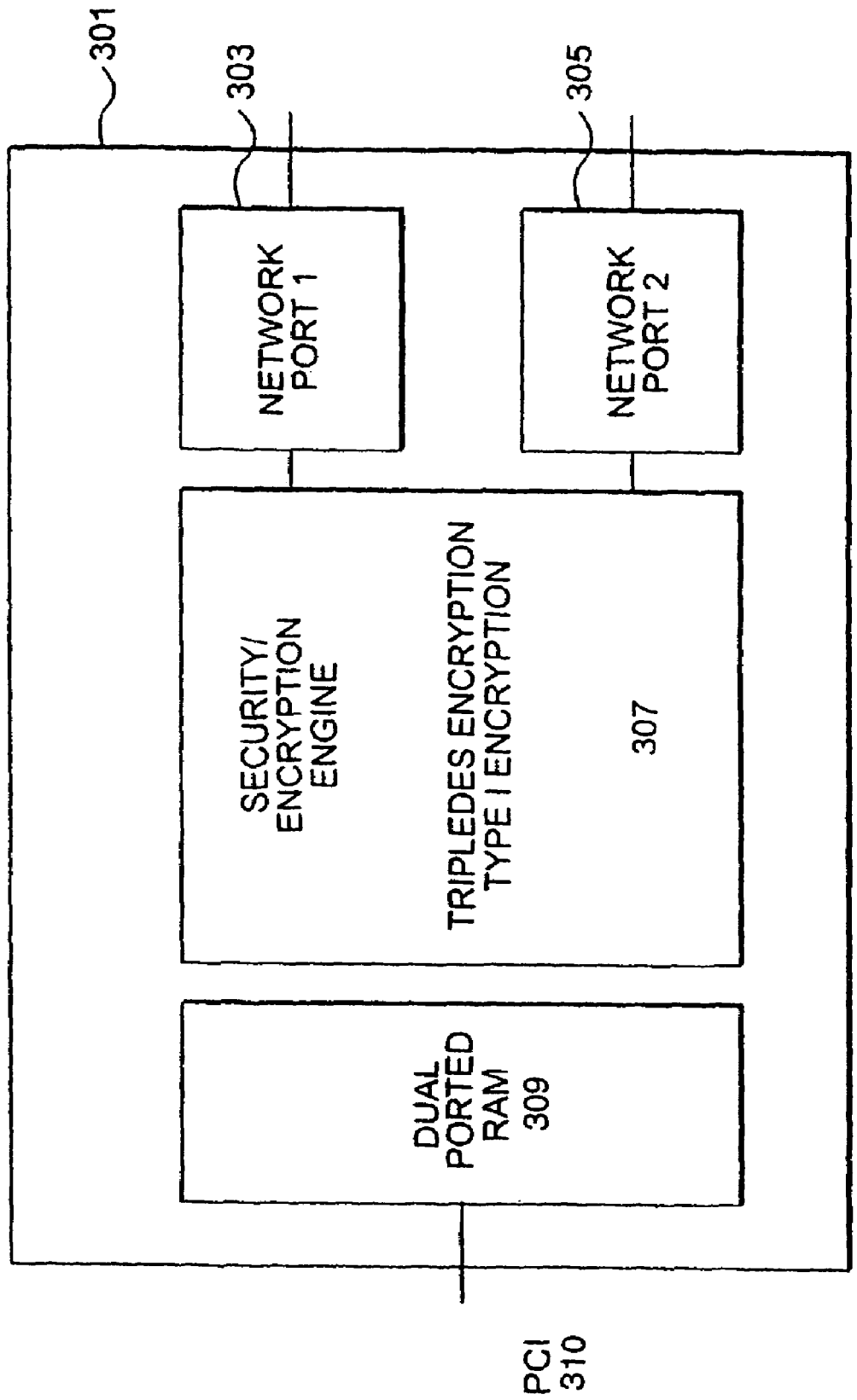
FIG. 3 is a schematic diagram of a preferred form security encryption engine of FIG. 2.

A preferred form and construction of the network communication interface 211 is shown in FIG. 3. Specifically, it is preferred to construct this module of the SPM card 201 as a daughter card which is preferably configured as a PCI mezzanine card (PMC) within the VME module. Such an articulation facilitates replacement of this card as technical developments make greater data rate accelerations possible and to change encryption hardware (or maintenance and/or reprogramming of internal codes, objects and the like), as may be desired from time to time as well as to add to the range of secure performance alternatives supported by the PMC card.

More specifically, The PMC card 301 includes a dual ported RAM 309 to support simultaneous read and write operations from the PCI bus or the security encryption engine 307, and two network ports 303 and 305. The security/encryption engine 307 preferably has a B2 or better security rating and is configured to require authorization and authentication of the SPM board or network nodes with which it communicates. In this regard, it was noted above, that the SPM card assigns security association/identification information to data packets regardless of whether or not such an identification is made of a given user. Therefore, each operation or data packet through the node is authenticated as to originating with a known node of the network and the information so collected can be used for detection of "foreign" data packets and tracking of the origin of any attack to at least the boundary of any connected and similarly secured network.

It should be appreciated that the range of secure performance alternatives made available in this fashion is, itself, an enhancement of security since it is only necessary for practice of the invention that the SPM (or PMC) cards be compatible within each network and installed at the desired granularity of protection. In fact, an incompatibility between SPM cards of different networks or even the presence of an unauthorized SPM card in or connected to a link of a communication could be detected, logged by a managed object as a possible intrusion and/or limit reporting (but not necessarily logging) upstream through another network during an attack or even be the basis of tracking and actively responding to an attack upstream across a plurality of networks.

Figure 4:
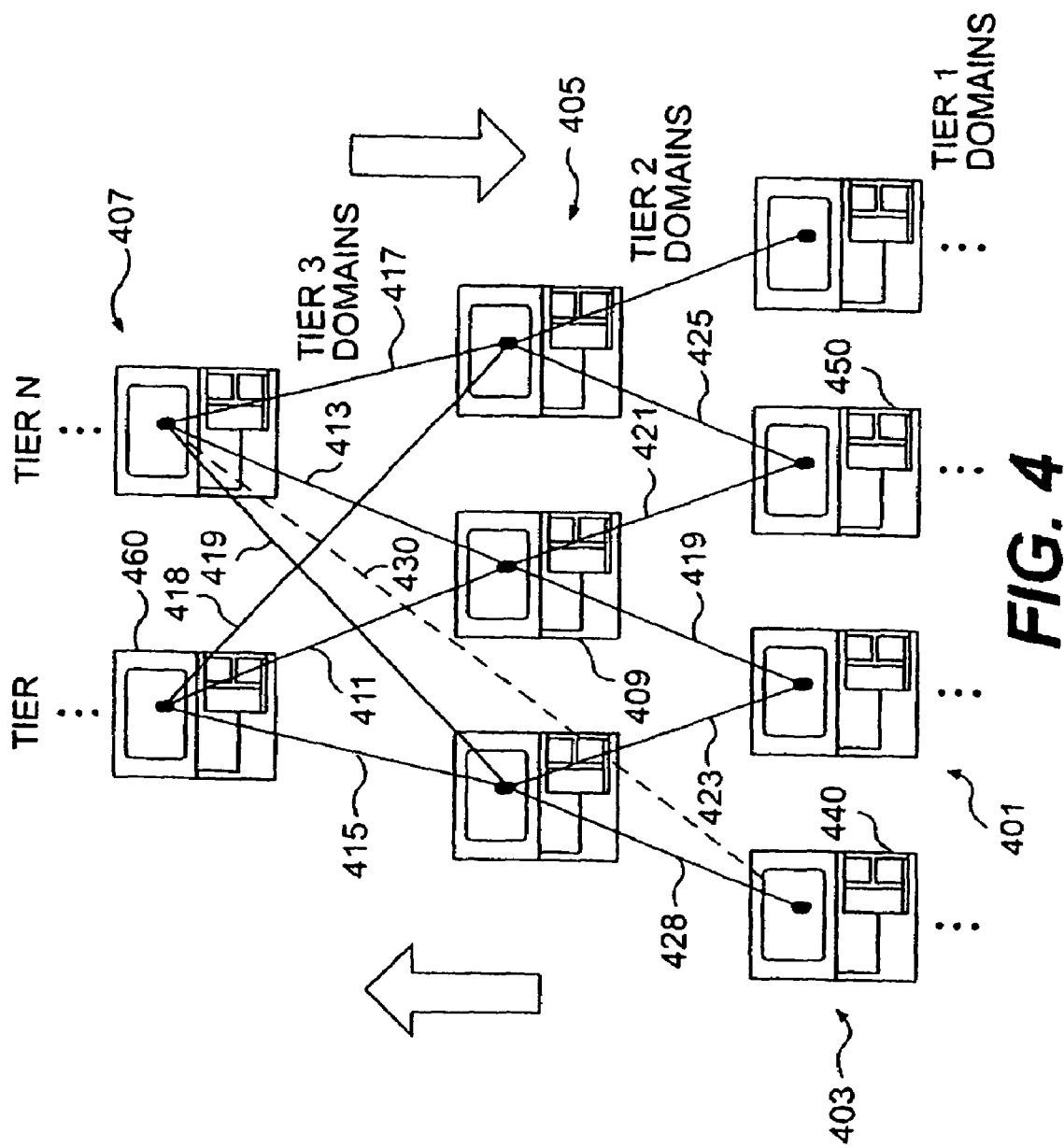
FIG. 4 is a schematic illustration of a redundant hierarchy of independently secured security domains in accordance with the invention.

Having described the infrastructure in accordance with the invention for an arbitrary node, the potential for providing a high level of security and fault tolerance (the ability of a system to maintain operability and provide substantially all services in the presence of one or more problems, errors, malfunctions or attacks) in a network environment will now be discussed in connection with FIGS. 4–7. In FIG. 4, a network 401 is shown hierarchically arranged in tiers 403, 405, 407 with communications paths (e.g. 415, 423) shown connecting respective adjacent tiers.

While a hierarchy of tiers is preferred and illustration of communication links limited to those between respective adjacent tiers as a matter of clarity, it is only necessary to the successful practice of the invention that any given tier have more than one node or a communication path past that tier and a tier at a locally higher hierarchical level. Even these requirements are only necessary to the extent of providing an orderly correspondence between manager objects and managed objects; which correspondencce could be accommodated in other ways that provide a locally hierarchically higher node for each node except for the highest tier. Other network configurations are also possible and may be desirable under particular circumstances or for particular applications.

For example, a communication link depicted by dashed line 430 could be used as a communication link through tier 405 with tier 407 above tier 403 or to place a node of tier 403 hierarchically above tier 407. Nevertheless, an organization containing communications links such as 430 may engender unjustified complexity although some advantages may accrue such as establishing further redundant communication paths and/or avoiding a top level of the hierarchy which might be an excessively attractive target for attack.

It should be noted that the network shown in FIG. 4 (without link 430) provides redundant communication links between all nodes of the network even though there are no links between nodes of the same tier, as is also preferred for practice of the invention. (In this regard, however, it should be recognized that the assignment of any given tier to any given node is arbitrary.) For example, node 440 can communicate with node 450 over communication links 428, 423, 419 and 421; 428, 415, 418 and 425; or 428, 419, 417 and 425. Other redundant paths would exist if the network were extended to more tiers and/or more nodes per tier.

Therefore, routers monitoring traffic on the network can assign any of a number of convenient paths between any two nodes of the network. Conventional network protocols, in fact, allow a plurality of different paths that may be of differing latency to be employed for a given message with the bit packets being reassembled in proper order after receipt by the intended destination node. The invention provides the additional functionality of eliminating and substituting paths for isolation of questionable or compromised nodes at the portal or gateway to each node to maintain substantially full network functionality while preventing proliferation of faults or damage from attacks as well as the attacks themselves.

The locally hierarchical architecture described above greatly enhances security throughout the network since a response to an attack on one node will be controlled by another node which should respond correctly unless that node is simultaneously under attack, as well (prior faults throughout the network having been previously encapsulated and isolated). In such a case, a manager object at yet another node at a locally higher hierarchical level would control the active response, and so on, while establishing a plurality of secure sessions and security domains over which control can be exercised through user transparent communications from a manager object at a node which remains trusted.

These communications and control can be carried out very rapidly (about twenty milliseconds per tier or less) and thus an active response to a potential attack can be made in substantially real time. This is in sharp contrast to security arrangements in prior networks which typically could only log operations during an attack for later analysis long after the attack and damage resulting therefrom are completed.

By the same token, temporary disconnection of network segments or sectors to test for the origin and scope of an attack or to interrupt an attack may be made so short as to be unnoticeable to an operator. Since the duration of any such disruption can be so short and the disruption thus minimized, very sensitive detection algorithms having relatively low initial confidence levels are tolerable for detection of potential attacks and to achieve a very high level of security. This capability provided by the present invention is particularly important is avoiding the effects of denial of service attacks which, by their nature, are difficult to distinguish from ordinary usage except by volume and possibly some similarity of transactions before such attacks are well under way and may have captured a significant portion of available resources.

Thus, an attack, to be successful, would require simultaneous attacks on virtually all nodes of the system, all nodes of the hierarchically highest tier of the system or an attack on the hierarchically highest node (if such a singular node is permitted in the network design; which is preferably avoided but should, in any case, be difficult to identify within the network since the relationships and dependencies in the network are identified only in the highly secure user-transparent communications between SPM cards which are preferably made difficult to intercept and analyze through high bit rate, low duty cycle transmissions and effective encryption). Such an attack would also need to be carried out simultaneously, if not synchronously, at both the communicating, network connected processor level and at the SMP processor level of at least a plurality of processors since the manager and managed objects of the SMP processors are effectively self-repairing by virtue of the CORBA extensions for fault tolerance alluded to above.

Figure 5:
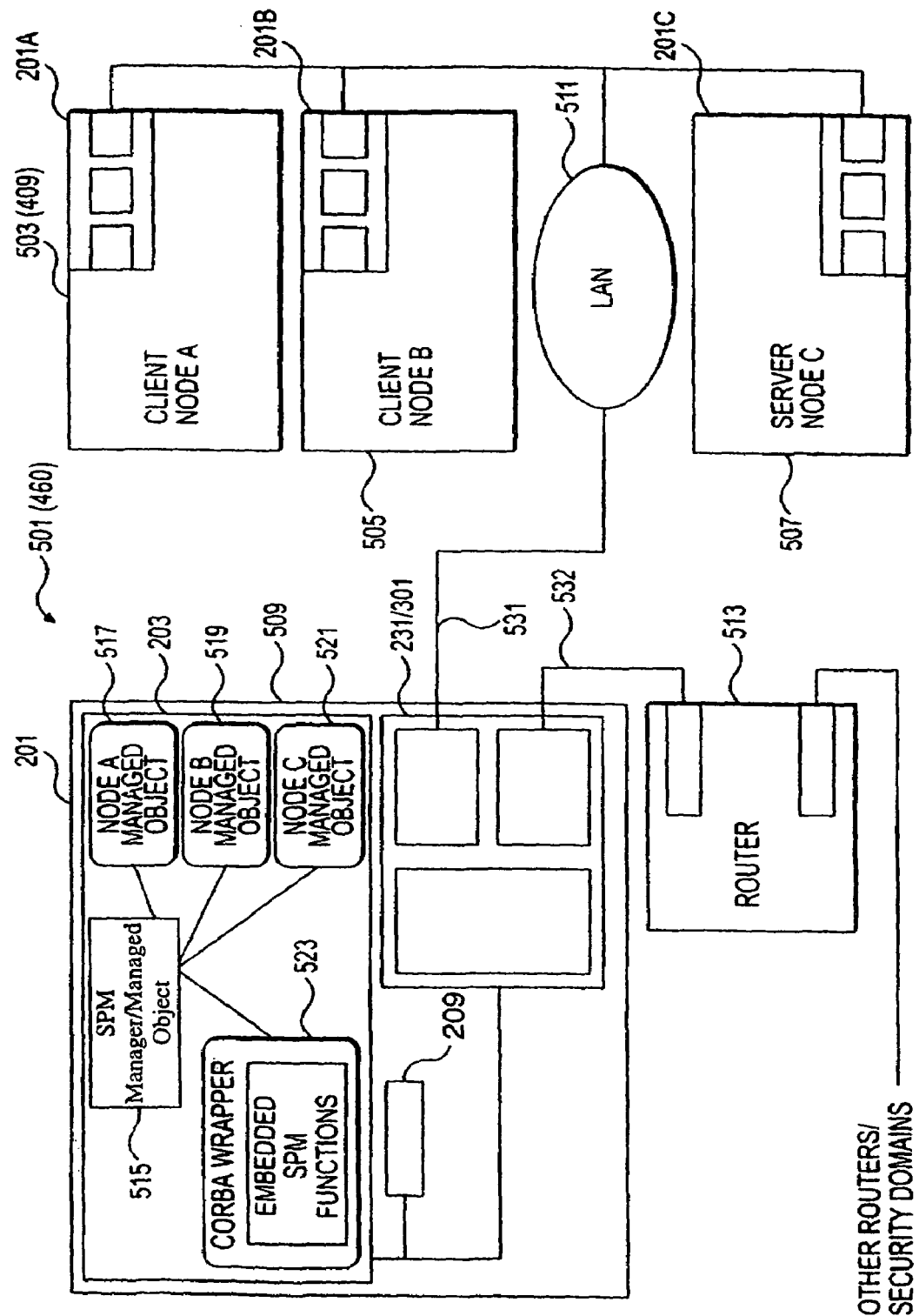
FIG. 5 is a schematic illustration of a system and software architecture in accordance with the present invention, FIG. 6 schematically illustrates a network transaction performed as a plurality of secure sessions in accordance with the invention, FIG. 7 schematically illustrates an exemplary preferred operation of the redundant hierarchy of FIG. 4.
Figure 6:
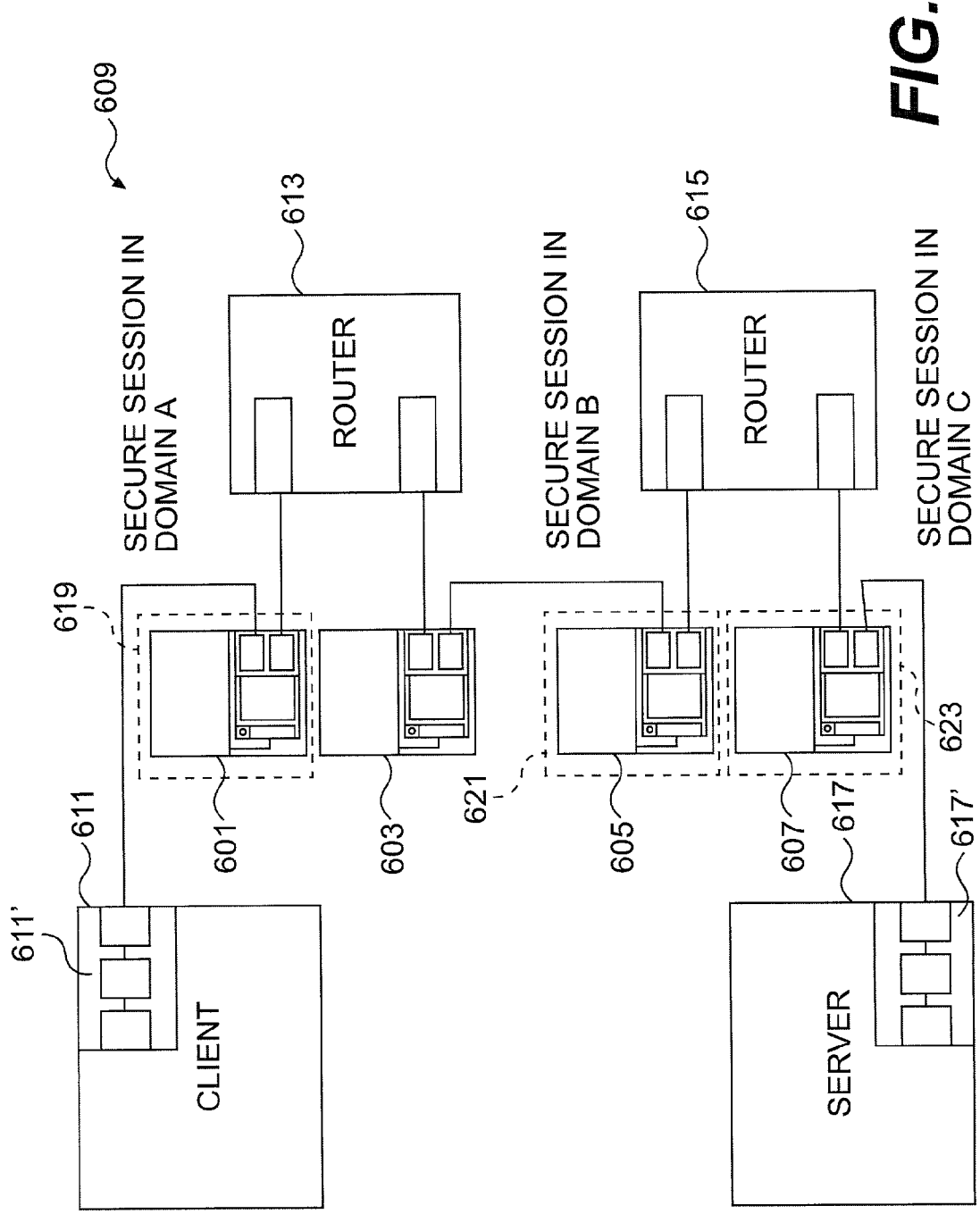

Referring now to FIGS. 5 and 6 an exemplary isolation operation supported by the invention will now be discussed. FIG. 5 shows a node 501 connected to a local area network 511 which is, in turn, connected to client nodes 503, 505 and server node 507. It will be recognized that node 501 is substantially as illustrated in FIG. 2, including an SPM board 201/509, processor 203 and PMC/interface card 231/301 and that node 501 and LAN 511 may represent any two directly communicating network nodes of FIG. 4, such as nodes 460 and 409, respectively. The embedded managed objects 517, 519, 521 for respective nodes 503, 505, 507 of LAN 511 and the SPM manager object 515, while part of the embedded SPM functions in the CORBA wrapper 523, are separately illustrated in order to illustrate communications therebetween.

A processor such as 203 will be provided in LAN 511 and/or respective nodes as indicated at 201A, 201B and 201C and will generate and transmit identifications corresponding to the node (e.g. A, B or C and/or LAN 511) from which any particular communication originates along with the message. This identification can also include similar identifications from downstream or other signals indicative of a potential fault or attack (e.g. other connections to nodes 503, 505 or 507). The communication (e.g. the identification, other signals and/or the communication) is decrypted, if necessary, logged in memory 209 and transferred to processor 203, where the CORBA wrapper allows the managed objects (e.g. 517, if the communication is from client node A) to monitor the message content and resulting processor activity. Alternatively or concurrently, the manager object 515 in node 501 can monitor the user transparent signals transmitted from nodes A, B and/or C corresponding to detection of faults and/or potential attacks detected at the processors of the respective nodes A, B and/or C which are also logged in memory 209.

Assuming the latter scenario and a fault or attack message originating at client node B, the manager object would determine that a fault or an attack was present at node B and send an encrypted or otherwise secure message (at a preferably high bit rate) that isolates client node B at either or both of port 531 or SPM board 201B by calling an appropriate managed object (e.g. 519 at one or more nodes or gateways thereto) to do so. Assuming that node 501 was also communicating with client node A, that communication, if normal, would be rerouted to node A through port 532 and router 513 through other redundant paths and nodes as illustrated in FIG. 4.

In the former scenario, the fault or potential attack occurring at node B would be detected by managed objects B at node 501 and communicated to manager object 515 or the manager object of the hierarchically upstream node (depending on the fault or activity indicating a potential attack) and similar isolation and rerouting action taken at node B or node 501, respectively. Thus it is seen that the fault or potential attack detection and resulting control action is multiply redundant and therefore, very difficult to defeat simultaneously on a plurality of nodes.

The articulation of any communication path between any client and any server node in the network of FIG. 4 that is achieved by the invention is shown in a generalized form 609 in FIG. 6. It can be appreciated from FIG. 4 that most communications or sessions between nodes will involve communications through a plurality of nodes since the direct connectivity of any given node is preferably limited for hardware economy. For purposes of this illustration, node 611 is the client node and node 617 is the server node and each has its own routers and SPM card 611', 617'. SPM cards 601, 603, 605 and 607 are at different respective nodes as are routers 613 and 615.

In accordance with the invention and the security capabilities engendered thereby, the SPM and CMIP manager objects possess the ability to arbitrarily define security domains and principals/users of the system (which may, in effect, include other security domains) to selectively allow access to trusted network components since the layers or tiers in the hierarchy which extends (at least locally) throughout the network environment or desired regions thereof. The layers or tiers provide constraint capabilities that include the sending workstation, the embedded SPM device and the target workstation for each defined security domain. Further, by defining the secure sessions and the security domains and use of the (encrypted) user transparent communications across each domain, the originating node of each communication is continuously authenticated, known and monitored (a capability not provided by the TCP/IP protocol) potentially to the data packet level to provide simplified and more rapid detection of potential attacks and closure of "half-open" connections as well as attack tracking and recovery.

Figure 7:
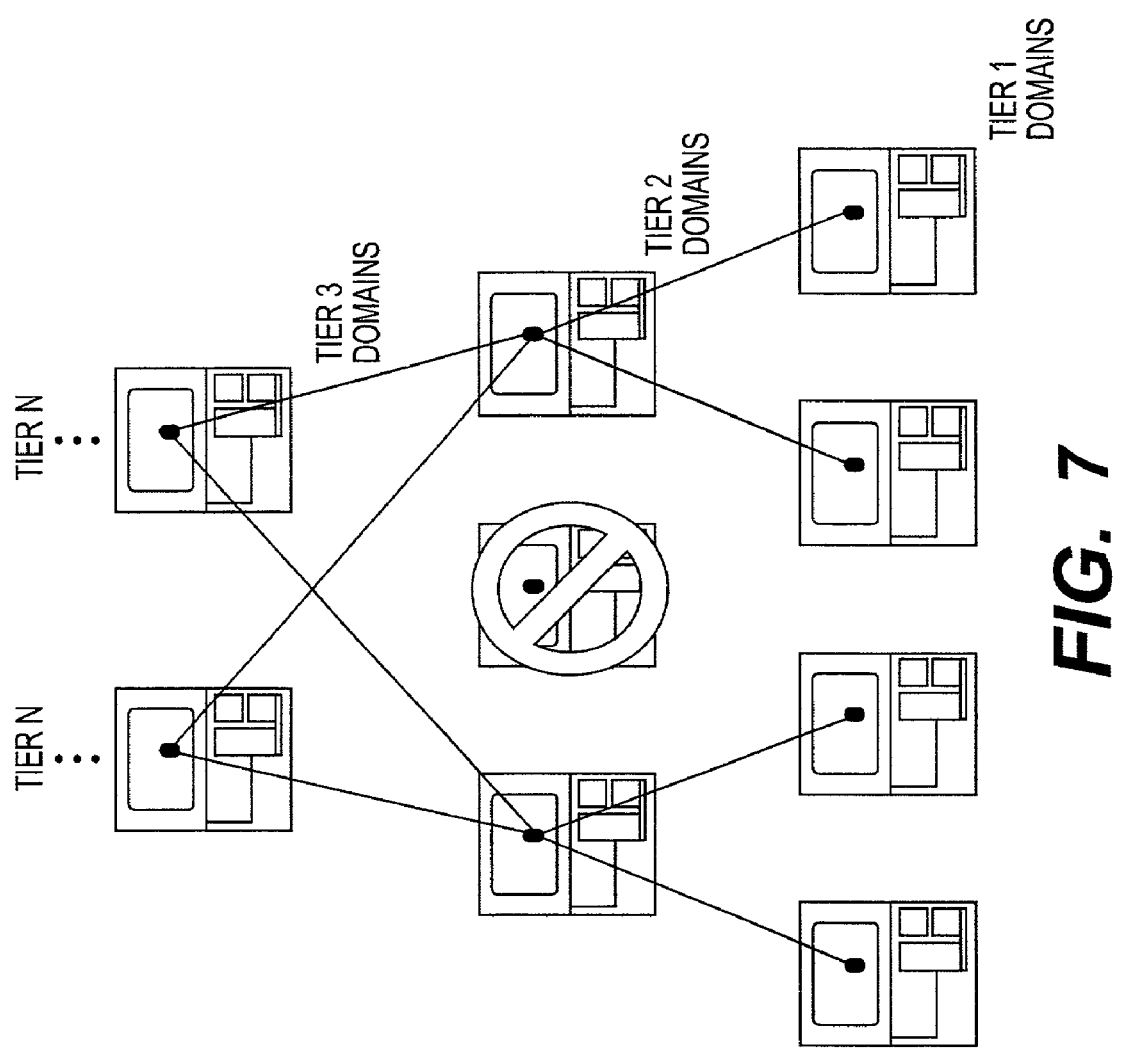

In prior networks, a user, once identified and authenticated, has access to the entire network insofar as the authorization for that user extends and a session would extend from the client node to the server node. In accordance with the invention, however, that session is divided into a plurality of secure sessions of different, serially connected security domains, as illustrated in FIG. 6. If any security domain (e.g. security domain A 601, B 621 or C 623) involved in the connectivity thus established is then compromised in any detectable manner or a fault occurs, that compromise and/or fault is reported and logged, the node at which the fault or attack occurs is isolated and the routers controlled to establish other secure sessions over redundant communication links, as shown in FIG. 7.

That is, when a user signs onto the network, keying information is provided by the SPM device that allows the sending device to generate authentication and encryption keys that are necessary to participate in secure communications. Additional information is provided to limit the communication capability of the transmitting device to authorized destinations. In the event of a security breach, the CMIP managers possess the ability (in the manager objects) to instruct the SPM device to enable and disable network ports to isolate network nodes or segments/sectors and notifies other trusted entities in the CMIP manager and managed object hierarchy of changes in trust for potentially contaminated or compromised network devices while the remainder of the trusted devices of the network continue to provide services while denying connection requests from untrusted sources, as can be seen from a comparison of FIGS. 4 and 7. Thus, protection from attacks by authorized users and against hijacked sessions, not previously available, can be provided as well as protection from attacks from other sources and of other types.

It should be understood that the above discussion of compartmentalizing a portion of the network to isolate the location of a fault or an attack is merely exemplary of many types of active responses to such a fault or attack of which the invention makes the network capable through integration of the extended CORBA architecture which supports fault tolerance, strong encryption with user transparent communications which are difficult to intercept or simulate, implementation of attack detection at a lower level of certainty/higher level of sensitivity and speed for real-time response and a fully flexible security policy capability. The capabilities of the invention may be more fully appreciated from the description of preferred operation and application of the invention described in the above-incorporated applications.

Figure 8:
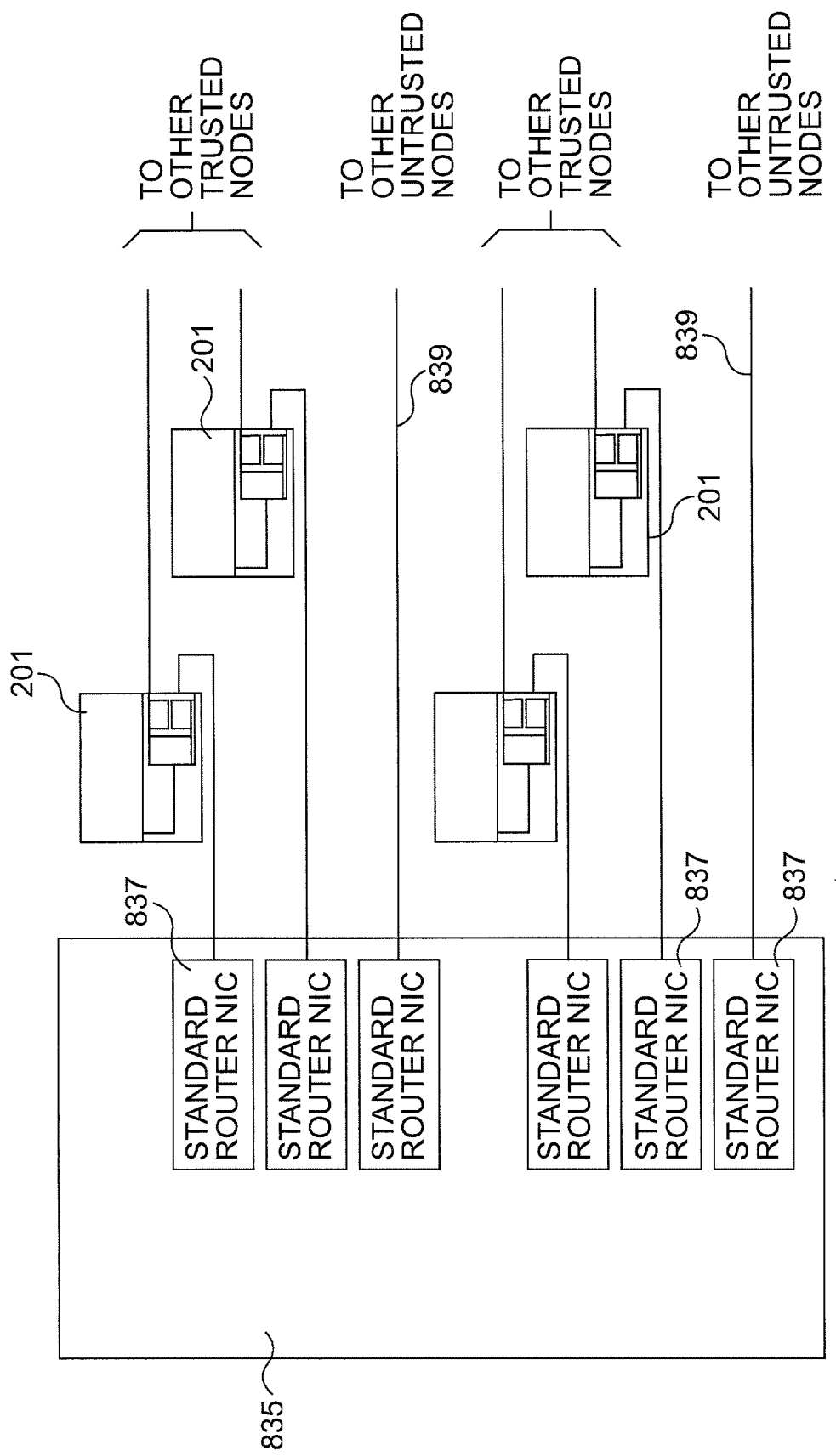
FIG. 8 illustrates application of the invention to both trusted and untrusted nodes of a heterogenous digital network.

FIG. 8 illustrates application of the invention to a heterogeneous network 833 including both trusted and untrusted nodes. It should be appreciated that such a system could result during incremental retrofitting of the invention into an existing network system or as a final configuration of a network intended to include both trusted and untrusted nodes. In the former case, the invention would generally be employed at the locations were considered to be most critical for security although, as alluded to above, firewalls can be defeated with relative ease at the present state of the art. It will also be recognized that the deployment of the structure discussed above in connection with FIGS. 1 and 2 essentially forms a router interface device 835 at the edge of a secure network protected in accordance with the invention as a plurality of standard router network interface controllers (NIC) 837.

Each NIC thus includes the capability of functioning to provide encapsulation in the same manner as a bottom tier node (see FIGS. 4 and 7) in regard to connections 839 to untrusted nodes. In the manner described above, NICs 837 will also function as a higher tier node when connected to the network security device 201 of another node and from that node to other trusted nodes. Accordingly, it is seen that the invention can be implemented globally or to any lesser degree in any network system and thus may be used to secure any desired portion of any network as criticality of security may dictate either by design or during a gradual and incremental retrofit into existing networks. Different protocols and different bit rates of the user transparent signalling may be accommodated in different branches of the network illustrated in FIG. 8. Thus full compatibility between branches is not required and a secure network portions employing the invention will maintain security during upgrades or changes in other branches.

In view of the foregoing, it is seen that the invention provides a high degree of fault tolerance as well as a high degree of security protection from a wide variety of attacks from sources that may include authorized and authenticated users and through hijacked authorized sessions. These meritorious effects can be achieved within an arbitrary existing hardware and software environment and without modification of existing protocols. Fine-grained compartmentalization of any fault or detected potential attack is provided in a manner very difficult to intercept or emulate and entirely transparent to the user while providing logging of information which facilitate error recovery and tracking of the source of any attack.

While the invention has been described in terms of a single preferred embodiment, those skilled in the art will recognize that the invention can be practiced with modification within the spirit and scope of the appended claims.

The invention claimed is:

1. A security device for installation at a node of a digital network, said security device comprising:
   a security engine for providing user transparent communications to another node of said digital network;
   at least two locking devices, wherein each locking device is coupled to the other locking devices and the security engine, and each locking device is configured to communicate with the other locking devices and with the security engine; and
   a programmed data processor including a memory to store data corresponding to said user communications and to store an embedded security policy manager and a manager object and at least one managed object, wherein the managed object is configured to detect communications at a first node having a characteristic which differs from a normal usage characteristic and to send an alarm through the manager object to said security engine for communication to a managed object of a second node, the managed object corresponding to said first node, as said user transparent communications and for responding to user transparent communications from said second node of said digital network and controlling of routing of communications in said digital network wherein said first node and said second node are hierarchically arranged locally in said digital network and arranged to provide redundant connections between nodes at different hierarchical levels.

2. A digital network for active intrusion resistance, said digital network comprising:
   a plurality of nodes arranged in a tiered hierarchy, each node including
     at least two locking devices;
     a security policy manager device for detecting network communications or activity having a characteristic different from a normal usage characteristic and providing a signal to other network nodes; and
     a communication module responsive to a user transparent signal from another node for controlling said at least two locking devices to isolate a node by selecting from among redundant communication paths in said digital network to maintain network communications between nodes that are not to be isolated and restricting communications with a node to be isolated, whereby the digital network actively resists intrusion by isolating one or more nodes that are determined to have become untrusted.

3. A digital network as recited in claim 2, wherein each node further includes a memory to store data corresponding to said user transparent communications and to store an embedded security policy manager, a manager object, and managed objects corresponding to each connected node.

4. A digital network as recited in claim 2, wherein said controlling of said at least two locking devices to isolate a node of said digital network is performed in real time.

5. A digital network as recited in claim 2, wherein said tiered hierarchy includes redundant connections between nodes at different levels in the hierarchy.

6. A digital network as recited in claim 2, wherein each node further includes a module for defining a secure session between nodes.

7. A digital network as recited in claim 6, wherein said module for defining a secure session includes a portion to transmit information corresponding to one of an authenticated user and an identification of a communicating node, wherein the identification of the communicating node can be used to isolate nodes corresponding to the secure session such that the digital network actively resists intrusion by compartmentalizing untrusted nodes within the secure session.

8. A digital network as recited in claim 2, wherein said characteristic which differs from said normal usage characteristics is a potential attack characteristic.

9. A digital network as recited in claim 2, wherein said characteristic that differs from said normal usage characteristic corresponds to a fault at a node or link of said digital network.

10. A digital network as recited in claim 2, wherein said manager object manages said managed object, and wherein each managed object corresponds to any external node coupled to each node.

11. A method of actively resisting intrusion in a digital network using extensions to an object request broker, said method comprising:
    providing object request broker software;
    extending the object request broker software to include encryption, intrusion detection, and security policy management and enforcement;
    generating a manager object on one or more nodes and at least one managed object on each node;
    detecting, with a managed object, a communication having a characteristic differing from a normal usage characteristic at a first node of said digital network, said communication received from a second node of said digital network;
    communicating a user transparent signal from a managed object of the first node to a managed object of a third digital network node responsive to said detection; and
    controlling communications, through coordinated managed and manager objects, at said first node and said third node to restrict communications from said second node with a user transparent signal.

12. A method as recited in claim 11, wherein said step of controlling communications includes steps of isolating said second node from said digital network to restrict untrusted communications from the second node from being allowed onto the digital network, and routing other digital network communications through redundant links between nodes of said digital network so as to bypass and isolate the second node.

13. A method as recited in claim 11, wherein said detecting step is performed by the managed object at the first node of said digital network and said controlling step is performed responsive to the managed object at said third node of said digital network.

14. A method as recited in claim 11, wherein said detecting, communicating and controlling steps are performed in substantially real time.

15. A method as recited in claim 11, including a further step of defining a secure session between a plurality of nodes in a communication path in said digital network, wherein said secure session allows compartmentalization of any untrusted nodes.

* * * * *